(12) United States Patent
Mesquita et al.

(10) Patent No.: US 11,705,935 B2
(45) Date of Patent: Jul. 18, 2023

(54) ANTENNA INTERFACE ARRANGEMENT

(71) Applicant: Telefonaktiebolaget LM Ericsson (publ), Stockholm (SE)

(72) Inventors: Fabien Mesquita, Limhamn (SE); Stefan Andersson, Flyinge (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 17/799,756

(22) PCT Filed: Mar. 20, 2020

(86) PCT No.: PCT/EP2020/057851
§ 371 (c)(1),
(2) Date: Aug. 15, 2022

(87) PCT Pub. No.: WO2021/185459
PCT Pub. Date: Sep. 23, 2021

(65) Prior Publication Data
US 2023/0073267 A1    Mar. 9, 2023

(51) Int. Cl.
*H04B 1/58* (2006.01)
*H04B 1/525* (2015.01)

(52) U.S. Cl.
CPC .............. *H04B 1/581* (2013.01); *H04B 1/525* (2013.01)

(58) Field of Classification Search
CPC ................................ H04B 1/581; H04B 1/525
See application file for complete search history.

(56) References Cited

U.S. PATENT DOCUMENTS 9,780,437 B2    10/2017 Knox
2007/0117524 A1    5/2007 Do
(Continued)

FOREIGN PATENT DOCUMENTS

CO    2019009868 A2    10/2019
GB    2480404 A        11/2011
(Continued)

OTHER PUBLICATIONS

Chen, Liang, et al., "A Monolithic Dual-Band 77/94 GHz Transceiver Front-End With Shared Frequency Multiplier", IEEE Access, vol. 9, 2019, pp. 177784-177792.

*Primary Examiner* — Junpeng Chen
(74) *Attorney, Agent, or Firm* — Murphy, Bilak & Homilier, PLLC

(57) ABSTRACT

An antenna interface arrangement is disclosed for cancellation of a transmit signal at a receiver port of a transceiver. The antenna interface arrangement comprises an amplifier and a distributed transformer having a primary side winding, a first secondary side winding, and a second secondary side winding. The primary side winding is connectable to a transmitter port of the transceiver and has a first part (311) and a second part (312), the first secondary side winding (313) is connectable to an antenna port of the transceiver and has a first inductive coupling to the first part of the primary side winding, and the second secondary side winding (314, 315) is connectable to the receiver port of the transceiver and has a second inductive coupling to the second part of the primary side winding. The amplifier (305, 306) has an input connected to the first secondary side winding and an output connected to the second secondary side winding. The second inductive coupling is adapted to provide a first version of the transmit signal at the receiver port, and the first inductive coupling and the amplifier are adapted to provide a second version of the transmit signal at the receiver port, for (Continued)

cancelling the first version of the transmit signal. Corresponding transceiver and communication device are also disclosed.

17 Claims, 4 Drawing Sheets

(56) References Cited

U.S. PATENT DOCUMENTS

| | | |
|---|---|---|
| 2013/0194978 A1 | 8/2013 | Andersson et al. |
| 2014/0009245 A1 | 1/2014 | Din et al. |
| 2014/0315501 A1 | 10/2014 | Rudell et al. |
| 2015/0222321 A1 | 8/2015 | Aandersson et al. |
| 2015/0270864 A1 | 9/2015 | Bryant et al. |
| 2016/0072542 A1 | 3/2016 | Din et al. |
| 2016/0254898 A1 | 9/2016 | Sjoland et al. |
| 2016/0294436 A1 | 10/2016 | Din et al. |
| 2017/0250728 A1* | 8/2017 | Afsahi ............... H04B 1/44 |
| 2019/0132021 A1* | 5/2019 | Khatib ............... H03F 3/245 |
| 2019/0334560 A1 | 10/2019 | Chi et al. |

FOREIGN PATENT DOCUMENTS

| | | |
|---|---|---|
| TW | 201409954 A | 3/2014 |
| TW | 201946395 A | 12/2019 |
| WO | 2015031748 A1 | 3/2015 |
| WO | 2018172939 A1 | 9/2018 |

\* cited by examiner (a)

(b)

(a)

(b)

ANTENNA INTERFACE ARRANGEMENT

TECHNICAL FIELD

The present disclosure relates generally to the field of antenna interfaces for transceivers where an antenna is shared by transmitter and receiver. More particularly, it relates to mitigation of signal leakage from transmitter to receiver.

BACKGROUND

Antenna interfaces are generally applicable for transceivers where an antenna is shared by transmitter and receiver. Sharing an antenna may cause signal leakage, e.g., from transmitter to receiver (a.k.a. self-interference). When a transmit signal (or part of a transmit signal) is leaked to the receiver, the receiver performance may be worsened compared to if there was no transmit signal leakage.

Thus, it may be desirable to mitigate signal leakage from transmitter to receiver for transceivers with a shared antenna. Mitigation of transmit signal leakage may be particularly desirable when transmission and reception occurs simultaneously and/or in a same frequency interval; e.g., when the transceiver is a full duplex transceiver or a half-duplex transceiver.

Self-interference mitigation may be solved by isolation (i.e., trying to minimize the leakage) or by cancellation (i.e., trying to subtract the leakage as seen by the receiver). Self-interference cancellation has the advantage that the cancellation typically accounts for transmitter impairments (e.g., power amplifier non-linearities).

Several approaches for self-interference mitigation exist; e.g., (passive or active) balanced duplexers, circulators, Wilkinson combiner, impedance balancing networks, etc. However, these solutions have drawbacks such as one or more of: sensitivity to antenna impedance, inherent 3 dB losses, relatively large physical size, high circuit complexity, hinders when attempting integration, incompatibility with full duplex operation (simultaneous transmission and reception using the same, or overlapping, frequency interval).

Thus, there is a need for alternative and/or improved antenna interfaces that provide mitigation of signal leakage from transmitter to receiver.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

Also generally, when a first feature is referred to herein as connectable to a second feature, the first feature may be configured to be connected to the second feature according to some embodiments, and may be connected to the second feature according to some embodiments.

It is an object of some embodiments to solve or mitigate, alleviate, or eliminate at least some of the above or other disadvantages.

A first aspect is an antenna interface arrangement for cancellation of a transmit signal at a receiver port of a transceiver. The antenna interface arrangement comprises a distributed transformer and an amplifier.

The distributed transformer has a primary side winding connectable to a transmitter port of the transceiver and having a first part and a second part, a first secondary side winding connectable to an antenna port of the transceiver and having a first inductive coupling to the first part of the primary side winding, and a second secondary side winding connectable to the receiver port of the transceiver and having a second inductive coupling to the second part of the primary side winding.

The amplifier has an input connected to the first secondary side winding and an output connected to the second secondary side winding.

The second inductive coupling is adapted to provide a first version of the transmit signal at the receiver port.

The first inductive coupling and the amplifier are adapted to provide a second version of the transmit signal at the receiver port, for cancelling the first version of the transmit signal.

In some embodiments, a first end of the first part of the primary side winding is connectable to the transmitter port of the transceiver, a second end of the first part of the primary side winding is connected to a first end of the second part of the primary side winding, a first end of the first secondary side winding is connected to the input of the amplifier and is connectable to the antenna port of the transceiver, and a first end of the second secondary side winding is connected to the output of the amplifier and is connectable to the receiver port of the transceiver.

In some embodiments, the transmitter port, the receiver port, and the antenna port are single-ended. In such embodiments, a second end of the second part of the primary side winding, a second end of the first secondary side winding, and a second end of the second secondary side winding may be connectable to a reference potential.

In some embodiments, the first and second inductive couplings are non-inverting inductive couplings, and the amplifier is an inverting amplifier.

In some embodiments, one of the first and second inductive couplings is an inverting inductive coupling, the other one of the first and second inductive couplings is a non-inverting inductive coupling, and the amplifier is a non-inverting amplifier.

In some embodiments, the transmitter port, the receiver port, and the antenna port are differential ports having a positive terminal and a negative terminal. In such embodiments, a second end of the second part of the primary side winding may be connectable to the transmitter port of the transceiver, a second end of the first secondary side winding may be connectable to the antenna port of the transceiver, and a second end of the second secondary side winding may be connectable to the receiver port of the transceiver.

In some embodiments, the first and second inductive couplings are non-inverting inductive couplings, and the amplifier comprises an inverting amplifier connectable between the positive terminal of the antenna port and the positive terminal of the receiver port and an inverting amplifier connectable between the negative terminal of the antenna port and the negative terminal of the receiver port.

In some embodiments, the first and second inductive couplings are non-inverting inductive couplings, and the amplifier comprises a non-inverting amplifier connectable between the positive terminal of the antenna port and the negative terminal of the receiver port and a non-inverting amplifier connectable between the negative terminal of the antenna port and the positive terminal of the receiver port.

In some embodiments, one of the first and second inductive couplings is an inverting inductive coupling, the other one of the first and second inductive couplings is a non-inverting inductive coupling, and the amplifier comprises an inverting amplifier connectable between the positive terminal of the antenna port and the negative terminal of the receiver port and an inverting amplifier connectable between the negative terminal of the antenna port and the positive terminal of the receiver port.

In some embodiments, one of the first and second inductive couplings is an inverting inductive coupling, the other one of the first and second inductive couplings is a non-inverting inductive coupling, and the amplifier comprises a non-inverting amplifier connectable between the positive terminal of the antenna port and the positive terminal of the receiver port and a non-inverting amplifier connectable between the negative terminal of the antenna port and the negative terminal of the receiver port.

In some embodiments, the antenna interface arrangement further comprises a receiver port impedance connected in parallel to the second secondary side winding and adapted to complement an input impedance of the receiver port of the transceiver, and/or a transmitter port impedance connected in parallel to the primary side winding and adapted to complement an output impedance of the transmitter port of the transceiver.

In some embodiments, an amplitude impact of the second inductive coupling on the transmit signal is equal to an amplitude impact on the transmit signal of a combination of the first inductive coupling and the amplifier.

In some embodiments, a phase impact of the second inductive coupling on the transmit signal and a phase impact on the transmit signal of a combination of the first inductive coupling and the amplifier has a modulo $2\pi$ phase difference equal to $\pi$ for a periodic transmit signal.

A second aspect is a transceiver comprising the antenna interface arrangement of the first aspect.

In some embodiments, the transceiver is a full-duplex transceiver or a half-duplex transceiver.

In some embodiments, the transceiver is a time division multiplex (TDD) transceiver.

A third aspect is a communication device comprising the antenna interface arrangement of the first aspect and/or the transceiver of the second aspect.

In some embodiments, any of the above aspects may additionally have features identical with or corresponding to any of the various features as explained above for any of the other aspects.

An advantage of some embodiments is that antenna interfaces are provided; configured to mitigate signal leakage from transmitter to receiver by cancellation.

An advantage of some embodiments is that the antenna interfaces are robust in relation to impedance variations of transceiver ports (one or more of: transmitter port impedance variations, receiver port impedance variations, and antenna port impedance variations).

An advantage of some embodiments is that the loss in the transmission path is relatively low. Optimization, or at least improvement, of the transmission path may be beneficial for system efficiency.

An advantage of some embodiments is that no adjustable dummy load is needed, which reduces the circuit complexity compared to some prior art approaches.

An advantage of some embodiments is that perfect (or close to perfect) cancellation can be obtained even with a non-ideal transformer; due to that the cancellation is achieved through an amplifier.

An advantage of some embodiments is that antenna interfaces are provided, which are suitable for communication standards with low power and/or full-duplex requirements (e.g., Bluetooth low energy, BLE, mesh).

An advantage of some embodiments is that adequate performance is achievable even with non-ideal components.

An advantage of some embodiments is that they are suitable for full integration in complementary metal oxide semiconductor (CMOS) technology, or any other suitable semiconductor technology.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

Figure 1:
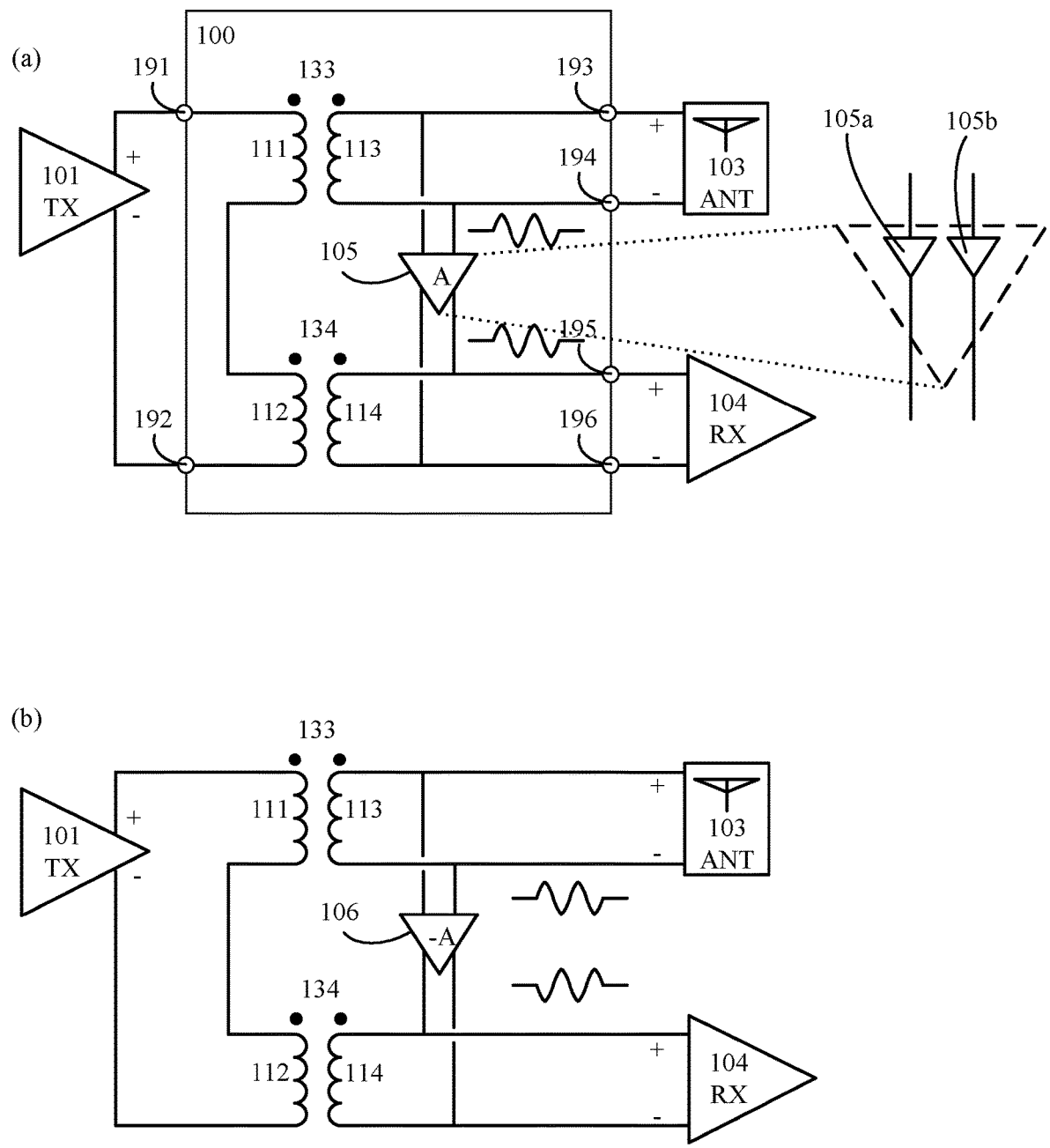
FIG. 1 is a schematic drawing illustrating example arrangements according to some embodiments.

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described where antenna interface arrangements are provided that mitigate signal leakage from transmitter to receiver. Mitigation is accomplished by cancellation. The transmit signal leakage may be completely or partially cancelled at the receiver according to various embodiments. Embodiments presented herein aim to achieve the cancellation by addition, at the receiver, of a signal which has the same amplitude and opposite phase (i.e., $\pi$, or 180°, phase difference) compared to the leaked portion of the transmit signal.

Some embodiments are suitable for transceivers where an antenna is shared by transmitter and receiver. Alternatively or additionally, some embodiments are suitable for transceivers where transmission and reception occurs simultaneously and/or in a same frequency interval; e.g., time division duplex (TDD) transceivers, and/or full duplex transceivers or half-duplex transceivers.

Some embodiments are suitable for communication devices (e.g., wireless communications devices) comprising transceivers. Example communication devices include a user equipment (UE), a base station (BS), or any other radio access node.

It should be noted that, even if the antenna interface arrangement is described herein in the context of wireless transceivers comprising an antenna, the antenna interface arrangement is equally applicable in other contexts as well. For example, the antenna interface arrangement may be used for a transceiver configured for communication over a wired medium. In such an example, the parts of the antenna interface arrangement which are connectable to an antenna port are simply connected to a non-antenna port of the transceiver.

Thus, when a part is described herein as connectable to an antenna port of a transceiver, it should be understood that the part is equally connectable to a non-antenna port of a transceiver, wherein the non-antenna port is a port for communication medium access.

The antenna interface arrangements described herein may be fully integrated in complementary metal oxide semiconductor (CMOS) technology, or any other suitable semiconductor technology, according to some embodiments.

The antenna interface arrangements described herein are transformer-based and may be viewed as an application of active cancellation approaches.

As will be apparent from the following examples, the antenna interface arrangement of some embodiments uses a signal sensed at the antenna port of a transceiver for cancellation of transmit signal leakage to the receiver port and an amplifier is used to adjust the amplitude (and phase) for cancellation.

FIG. 1 schematically illustrates two example arrangements according to some embodiments.

Part (a) of FIG. 1 shows an example antenna interface arrangement 100 for cancellation of a transmit signal at a receiver port of a transceiver. Example connection of the antenna interface arrangement to a transmitter (TX) 101, a receiver (RX) 104, and an antenna (ANT) 103 of a transceiver is also shown.

The antenna interface arrangement 100 comprises an amplifier (A) 105 and a distributed transformer. The distributed transformer has a primary side winding with a first part 111 and a second part 112, a first secondary side winding 113, and a second secondary side winding 114. The first secondary side winding 113 has a first inductive coupling 133 to the first part 111 of the primary side winding, and the second secondary side winding 114 has a second inductive coupling 134 to the second part 112 of the primary side winding.

In the transceiver exemplified in part (a) of FIG. 1, the transmitter port, the receiver port, and the antenna port are differential ports having a positive terminal and a negative terminal.

A first end of the first part 111 of the primary side winding is connectable to one of the terminals 191 (terminal "+" in this example) of the transmitter port of the transceiver, a second end of the first part 111 of the primary side winding is connected to a first end of the second part 112 of the primary side winding, and a second end of the second part 112 of the primary side winding is connectable to the other one of the terminals 192 (terminal "−" in this example) of the transmitter port of the transceiver.

A first end of the first secondary side winding 113 is connectable to one of the terminals 193 (terminal "+" in this example) of the antenna port of the transceiver, and a second end of the first secondary side winding 113 is connectable to the other one of the terminals 194 (terminal "−" in this example) of the antenna port of the transceiver.

A first end of the second secondary side winding 114 is connectable to one of the terminals 195 (terminal "+" in this example) of the receiver port of the transceiver, and a second end of the second secondary side winding 114 is connectable to the other one of the terminals 196 (terminal "−" in this example) of the receiver port of the transceiver.

The amplifier 105 (which may be implemented as a single amplifier with dual inputs and dual corresponding outputs; or as two separate amplifiers 105a, 105b, each having single input and corresponding single output) has its inputs connected to the first secondary side winding 113 and its outputs connected to the second secondary side winding 114. More specifically, in this implementation, the amplifier has one input connected to the first end of the first secondary side winding and the corresponding output connected to the second end of the second secondary side winding, and has the other input connected to the second end of the first secondary side winding and the corresponding output connected to the first end of the second secondary side winding.

Generally, the second inductive coupling is adapted to provide a first version of the transmit signal at the receiver port, and the first inductive coupling and the amplifier are adapted to provide a second version of the transmit signal at the receiver port. Also generally, it is an aim that the second version of the transmit signal cancels the first version of the transmit signal. One way to achieve this is to provide the second version of the transmit signal as having the same amplitude and opposite phase as the first version of the transmit signal.

In the implementation shown in part (a) of FIG. 1, the first and second inductive couplings 133, 134 are non-inverting inductive couplings, and the amplifier is non-inverting. Corresponding input and output of the amplifier are connected between the positive terminal "+" of the antenna port and the negative terminal "−" of the receiver port, and the other corresponding input and output of the amplifier are connected between the negative terminal "−" of the antenna port and the positive terminal "+" of the receiver port. Thereby, a phase impact of the second inductive coupling 134 on the transmit signal and a phase impact on the transmit signal of a combination of the first inductive coupling 133 and the amplifier 105 has a modulo $2\pi$ phase difference equal to $\pi$ (i.e., opposite phases) for a periodic transmit signal; due to the amplifier coupling between positive antenna port terminal and negative receiver port terminal, and between negative antenna port terminal and positive receiver port terminal.

The amplification of the amplifier 105 should preferably be selected such that an amplitude impact of the second inductive coupling 134 on the transmit signal is equal to an amplitude impact on the transmit signal of a combination of the first inductive coupling 133 and the amplifier 105. For example, if the amplitude impact of the second inductive coupling 134 on the transmit signal is denoted A32 and the amplitude impact of the first inductive coupling 133 on the transmit signal is denoted A12, the amplification A31 of the amplifier 105 could be selected as A31=A32/A12.

To exemplify further (assuming that the antenna port is port 1, the transmitter port is port 2, and the receiver port is port 3, and that S12 represents the coupling from transmitter to antenna, S31 represents the coupling from antenna to receiver, and S32 represents the coupling from transmitter to receiver), a signal present at the antenna port may be denoted as S12·TX+ANT, where the transmitter signal is denoted TX and ANT is a signal received by the antenna. Then, if the arrangement of part (a) in FIG. 1 is used, the amplifier (corresponding to coupling S31) delivers a signal denoted as −S31(S12·TX+ANT) to the receiver port, where the minus sign is due to the couplings between positive and negative port terminals via the amplifier. Thus, if the amplifier is designed and connected such that S32−S31·S12=0, the leakage of TX to the receiver port is cancelled.

The magnetic connection between transmitter and receiver introduces 180° phase rotation if the inductive couplings 133 and 134 are either both non-inverting or both inverting, and the magnetic connection between transmitter and receiver introduces no phase rotation if one of the inductive couplings is non-inverting and the other one of the inductive couplings is inverting.

Since the second inductive coupling part S31 of the transformer is excited by TX at the primary side and by −TX at the secondary side, the transmit path through the first inductive coupling part S21 of the transformer is not impacted (i.e. the second part 112 of the primary side winding looks like a short-circuit as seen from the transceiver).

Part (b) of FIG. 1 shows a slightly different example antenna interface arrangement for cancellation of a transmit signal at a receiver port of a transceiver when connected to a differential port transmitter (TX) 101, a differential port receiver (RX) 104, and a differential port antenna (ANT) 103 of a transceiver. The boundary of the antenna interface arrangement (compare with 100 of part (a)) and the transceiver ports (compare with 191, 192, 193, 194, 195, 196 of part (a)) are omitted for simplicity of representation.

This antenna interface arrangement comprises an inverting amplifier (−A) 106 and a distributed transformer. The distributed transformer corresponds to that of part (a) of FIG. 1.

The amplifier 106 (which may be implemented as a single amplifier with dual inputs and dual outputs; or as two separate amplifiers, each having single input and single output) has its inputs connected to the first secondary side winding 113 and its outputs connected to the second secondary side winding 114. More specifically, in this implementation, the amplifier has one input connected to the first end of the first secondary side winding and the corresponding output connected to the first end of the second secondary side winding, and has the other input connected to the second end of the first secondary side winding and the corresponding output connected to the second end of the second secondary side winding.

In the implementation shown in part (b) of FIG. 1, the first and second inductive couplings 133, 134 are non-inverting inductive couplings, and the amplifier is inverting. Corresponding input and output of the amplifier are connected between the positive terminal "+" of the antenna port and the positive terminal "+" of the receiver port, and the other corresponding input and output of the amplifier are connected between the negative terminal "−" of the antenna port and the negative terminal "−" of the receiver port. Thereby, a phase impact of the second inductive coupling 134 on the transmit signal and a phase impact on the transmit signal of a combination of the first inductive coupling 133 and the amplifier 106 has a modulo $2\pi$ phase difference equal to $\pi$ (i.e., opposite phases) for a periodic transmit signal; due to inversion in the amplifier.

The amplification of the amplifier 106 should preferably be selected such that an amplitude impact of the second inductive coupling 134 on the transmit signal is equal to an amplitude impact on the transmit signal of a combination of the first inductive coupling 133 and the amplifier 106.

Other example antenna interface arrangements for cancellation of a transmit signal at a receiver port of a transceiver may be achieved by letting both first and second inductive couplings 133, 134 be inverting inductive couplings in either part (a) or part (b) of FIG. 1.

Figure 2:
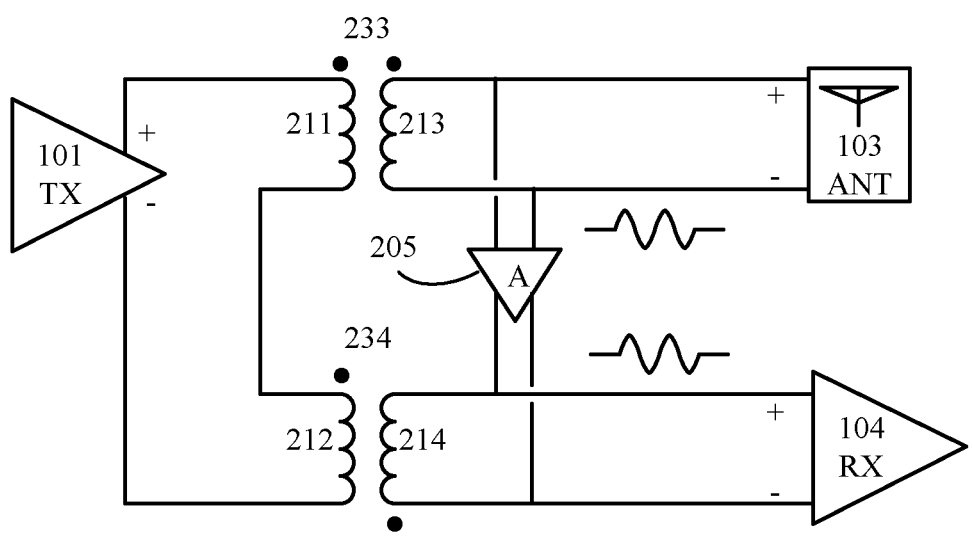
FIG. 2 is a schematic drawing illustrating example arrangements according to some embodiments.
Figure 2:
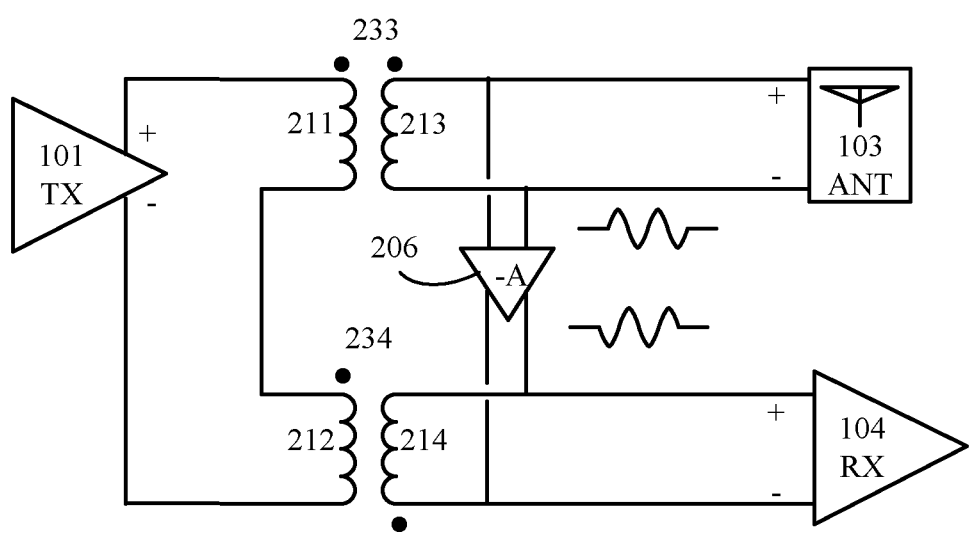

FIG. 2 schematically illustrates two example arrangements according to some embodiments.

Part (a) of FIG. 2 shows an example antenna interface arrangement for cancellation of a transmit signal at a receiver port of a transceiver when connected to a differential port transmitter (TX) 101, a differential port receiver (RX) 104, and a differential port antenna (ANT) 103 of a transceiver. The boundary of the antenna interface arrangement (compare with 100 of part (a) in FIG. 1) and the transceiver ports (compare with 191, 192, 193, 194, 195, 196 of part (a) in FIG. 1) are omitted for simplicity of representation.

The antenna interface arrangement comprises an amplifier (A) 205 and a distributed transformer. The distributed transformer has a primary side winding with a first part 211 and a second part 212, a first secondary side winding 113, and a second secondary side winding 214.

The first secondary side winding 213 has a first inductive coupling 233 to the first part 211 of the primary side winding, and the second secondary side winding 214 has a second inductive coupling 234 to the second part 212 of the primary side winding.

A first end of the first part 211 of the primary side winding is connectable to one of the terminals (terminal "+" in this example) of the transmitter port of the transceiver, a second end of the first part 211 of the primary side winding is connected to a first end of the second part 212 of the primary side winding, and a second end of the second part 212 of the primary side winding is connectable to the other one of the terminals (terminal "−" in this example) of the transmitter port of the transceiver.

A first end of the first secondary side winding 213 is connectable to one of the terminals (terminal "+" in this example) of the antenna port of the transceiver, and a second end of the first secondary side winding 213 is connectable to the other one of the terminals (terminal "−" in this example) of the antenna port of the transceiver.

A first end of the second secondary side winding 214 is connectable to one of the terminals (terminal "+" in this example) of the receiver port of the transceiver, and a second end of the second secondary side winding 214 is connectable to the other one of the terminals (terminal "−" in this example) of the receiver port of the transceiver.

The amplifier 205 (which may be implemented as a single amplifier with dual inputs and dual outputs; or as two separate amplifiers, each having single input and single output) has its inputs connected to the first secondary side winding 213 and its outputs connected to the second secondary side winding 214. More specifically, in this implementation, the amplifier has one input connected to the first end of the first secondary side winding and the corresponding output connected to the first end of the second secondary side winding, and has the other input connected to the second end of the first secondary side winding and the corresponding output connected to the second end of the second secondary side winding.

In the implementation shown in part (a) of FIG. 2, the first inductive coupling 233 is a non-inverting inductive coupling, the second inductive coupling 234 is an inverting inductive coupling, and the amplifier is non-inverting. Corresponding input and output of the amplifier are connected between the positive terminal "+" of the antenna port and the positive terminal "+" of the receiver port, and the other corresponding input and output of the amplifier are connected between the negative terminal "−" of the antenna port and the negative terminal "−" of the receiver port. Thereby, a phase impact of the second inductive coupling 234 on the transmit signal and a phase impact on the transmit signal of a combination of the first inductive coupling 233 and the amplifier 205 has a modulo $2\pi$ phase difference equal to $\pi$ (i.e., opposite phases) for a periodic transmit signal; due to the inversion in the second inductive coupling.

The amplification of the amplifier 205 should preferably be selected such that an amplitude impact of the second inductive coupling 234 on the transmit signal is equal to an amplitude impact on the transmit signal of a combination of the first inductive coupling 233 and the amplifier 205.

Part (b) of FIG. 2 shows a slightly different example antenna interface arrangement for cancellation of a transmit signal at a receiver port of a transceiver when connected to a differential port transmitter (TX) 101, a differential port receiver (RX) 104, and a differential port antenna (ANT) 103 of a transceiver. The boundary of the antenna interface arrangement (compare with 100 of part (a) in FIG. 1) and the transceiver ports (compare with 191, 192, 193, 194, 195, 196 of part (a) in FIG. 1) are omitted for simplicity of representation.

This antenna interface arrangement comprises an inverting amplifier (−A) 206 and a distributed transformer. The distributed transformer corresponds to that of part (a) of FIG. 2.

The amplifier 206 (which may be implemented as a single amplifier with dual inputs and dual outputs; or as two separate amplifiers, each having single input and single output) has its inputs connected to the first secondary side winding 213 and its outputs connected to the second secondary side winding 214. More specifically, in this implementation, the amplifier has one input connected to the first end of the first secondary side winding and the corresponding output connected to the second end of the second secondary side winding, and has the other input connected to the second end of the first secondary side winding and the corresponding output connected to the first end of the second secondary side winding.

In the implementation shown in part (b) of FIG. 2, the first inductive coupling 233 is a non-inverting inductive coupling, the second inductive coupling 234 is an inverting inductive coupling, and the amplifier is inverting. Corresponding input and output of the amplifier are connected between the positive terminal "+" of the antenna port and the negative terminal "−" of the receiver port, and the other corresponding input and output of the amplifier are connected between the positive terminal "+" of the antenna port and the negative terminal "−" of the receiver port. Thereby, a phase impact of the second inductive coupling 234 on the transmit signal and a phase impact on the transmit signal of a combination of the first inductive coupling 233 and the amplifier 206 has a modulo $2\pi$ phase difference equal to $\pi$ (i.e., opposite phases) for a periodic transmit signal; due to the inversion in the second inductive coupling, the amplifier coupling between positive and negative port terminals, and inversion in the amplifier.

The amplification of the amplifier 206 should preferably be selected such that an amplitude impact of the second inductive coupling 234 on the transmit signal is equal to an amplitude impact on the transmit signal of a combination of the first inductive coupling 233 and the amplifier 206.

Other example antenna interface arrangements for cancellation of a transmit signal at a receiver port of a transceiver may be achieved by letting the first inductive coupling 233 be an inverting inductive coupling and letting the second inductive coupling 234 be a non-inverting inductive coupling in either part (a) or part (b) of FIG. 2.

Figure 3:
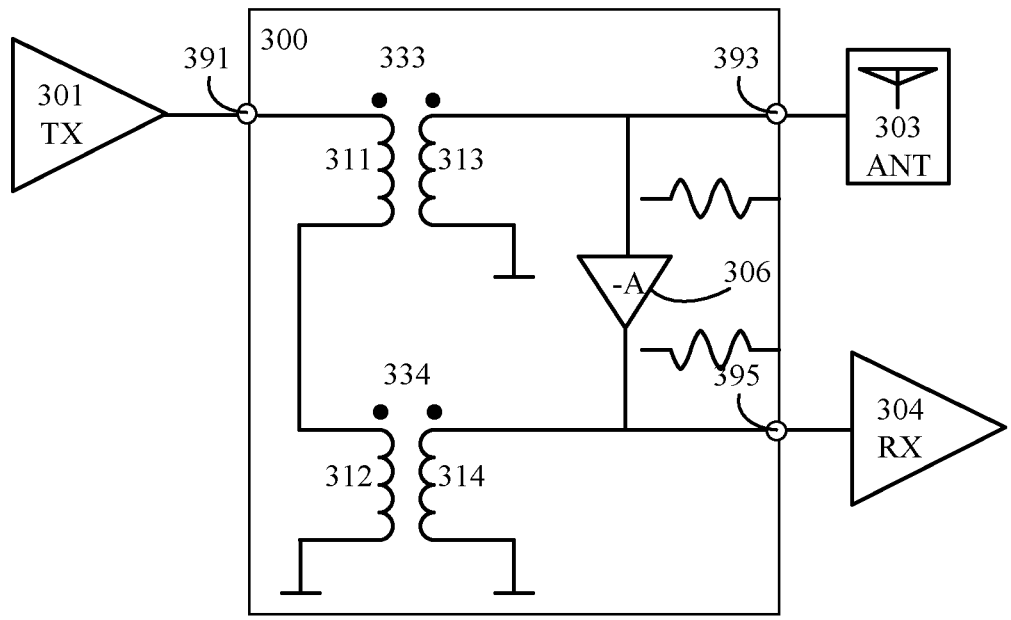
FIG. 3 is a schematic drawing illustrating example arrangements according to some embodiments.
Figure 3:
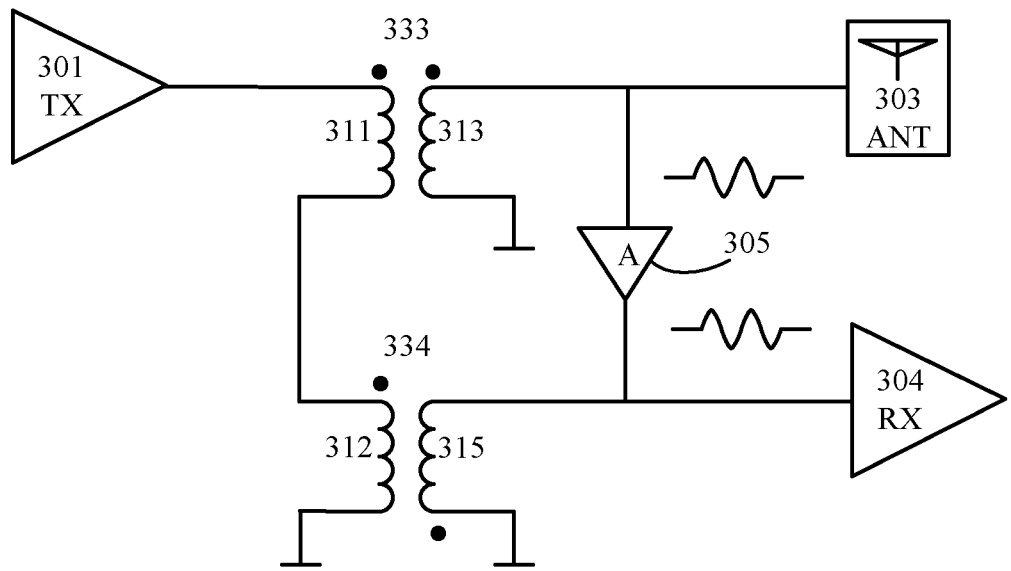

FIG. 3 schematically illustrates two example arrangements according to some embodiments.

Part (a) of FIG. 3 shows an example antenna interface arrangement 300 for cancellation of a transmit signal at a receiver port of a transceiver. Example connection of the antenna interface arrangement to a transmitter (TX) 301, a receiver (RX) 304, and an antenna (ANT) 303 of a transceiver is also shown.

The antenna interface arrangement 300 comprises an amplifier (−A) 306 and a distributed transformer. The distributed transformer has a primary side winding with a first part 311 and a second part 312, a first secondary side winding 313, and a second secondary side winding 314. The first secondary side winding 313 has a first inductive coupling 333 to the first part 311 of the primary side winding, and the second secondary side winding 314 has a second inductive coupling 334 to the second part 312 of the primary side winding.

In the transceiver exemplified in part (a) of FIG. 3, the transmitter port, the receiver port, and the antenna port are single-ended ports.

A first end of the first part 311 of the primary side winding is connectable to the transmitter port 391 of the transceiver, a second end of the first part 311 of the primary side winding is connected to a first end of the second part 312 of the primary side winding, and a second end of the second part 312 of the primary side winding is connectable to a reference potential (e.g., a ground potential).

A first end of the first secondary side winding 313 is connectable to the antenna port 393 of the transceiver, and a second end of the first secondary side winding 313 is connectable to a reference potential (e.g., a ground potential).

A first end of the second secondary side winding 314 is connectable to the receiver port 395 of the transceiver, and a second end of the second secondary side winding 314 is connectable to a reference potential (e.g., a ground potential).

The amplifier 306 has its input connected to the first end of the first secondary side winding 313 and its output connected to the first end of the second secondary side winding 314.

In the implementation shown in part (a) of FIG. 3, the first and second inductive couplings 333, 334 are non-inverting inductive couplings, and the amplifier is inverting. Thereby, a phase impact of the second inductive coupling 334 on the transmit signal and a phase impact on the transmit signal of a combination of the first inductive coupling 333 and the amplifier 306 has a modulo $2\pi$ phase difference equal to $\pi$ (i.e., opposite phases) for a periodic transmit signal; due to inversion in the amplifier.

The amplification of the amplifier 306 should preferably be selected such that an amplitude impact of the second inductive coupling 334 on the transmit signal is equal to an amplitude impact on the transmit signal of a combination of the first inductive coupling 333 and the amplifier 306.

Part (b) of FIG. 3 shows a slightly different example antenna interface arrangement for cancellation of a transmit signal at a receiver port of a transceiver when connected to a single-ended port transmitter (TX) 301, a single-ended port receiver (RX) 304, and a single-ended port antenna (ANT) 303 of a transceiver. The boundary of the antenna interface arrangement (compare with 300 of part (a)) and the transceiver ports (compare with 391, 393, 395 of part (a)) are omitted for simplicity of representation.

This antenna interface arrangement comprises a non-inverting amplifier (A) 305 and a distributed transformer. The distributed transformer corresponds to that of part (a) of FIG. 3, except that the second inductive coupling 334 is an inverting inductive coupling.

The amplifier 305 has its input connected to the first end of the first secondary side winding 313 and its output connected to the first end of the second secondary side winding 314.

In the implementation shown in part (b) of FIG. 3, the first inductive coupling 333 is a non-inverting inductive coupling, the second inductive coupling 334 is an inverting inductive coupling, and the amplifier is non-inverting. Thereby, a phase impact of the second inductive coupling 334 on the transmit signal and a phase impact on the transmit signal of a combination of the first inductive coupling 333 and the amplifier 305 has a modulo $2\pi$ phase difference equal to $\pi$ (i.e., opposite phases) for a periodic transmit signal; due to the inversion in the second inductive coupling.

The amplification of the amplifier 305 should preferably be selected such that an amplitude impact of the second inductive coupling 334 on the transmit signal is equal to an amplitude impact on the transmit signal of a combination of the first inductive coupling 333 and the amplifier 305.

Other example antenna interface arrangements for cancellation of a transmit signal at a receiver port of a transceiver may be achieved by letting both first and second inductive couplings 333, 334 be inverting inductive couplings in part (a) of FIG. 3, or by letting the first inductive coupling 333 be an inverting inductive coupling and letting the second inductive coupling 334 be a non-inverting inductive coupling in part (b) of FIG. 3.

Figure 4:
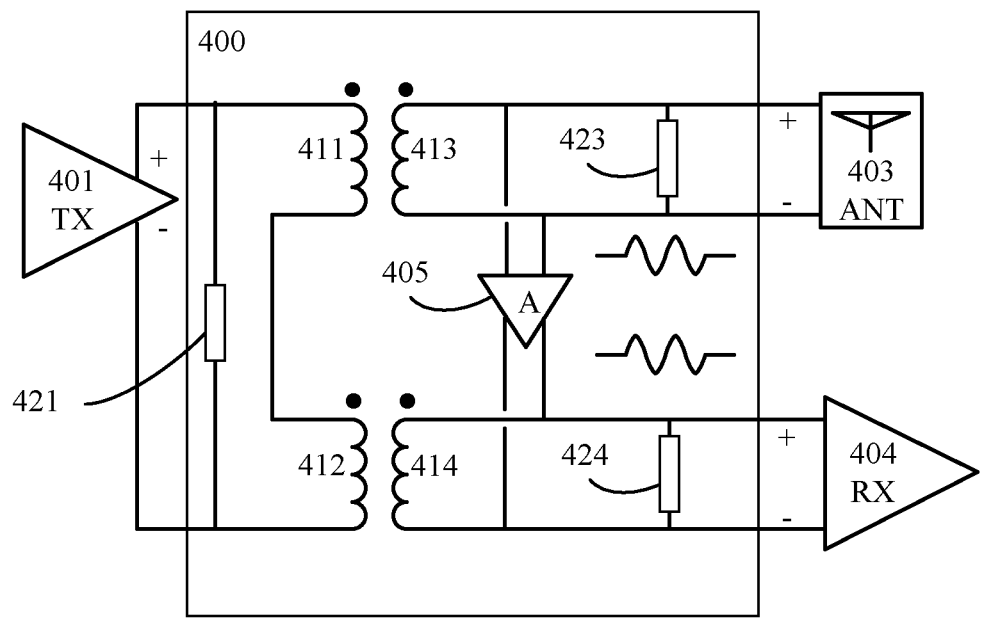
FIG. 4 is a schematic drawing illustrating an example arrangement according to some embodiments.

FIG. 4 schematically illustrates an adjusted example arrangement 400 according to some embodiments. The adjusted example antenna interface arrangement of FIG. 4 is similar to the example antenna interface arrangement 100 illustrated in part (a) of FIG. 1, with the addition of one or more port impedances 421, 423, 424. Corresponding adjustments—i.e., addition of one or more port impedances—may be applied for any of the other example antenna interface arrangements described herein (e.g., in part (b) of FIG. 1, in any of parts (a) and (b) of FIG. 2, or in any of parts (a) and (b) of FIG. 3).

The adjusted example antenna interface arrangement 400 is for cancellation of a transmit signal at a receiver port of a transceiver. Example connection of the antenna interface arrangement to a transmitter (TX) 401, a receiver (RX) 404, and an antenna (ANT) 403 of a transceiver is also shown.

In similarity with part (a) of FIG. 1, the antenna interface arrangement 400 comprises an amplifier (A) 405 and a distributed transformer. The distributed transformer has a primary side winding with a first part 411 and a second part 412, a first secondary side winding 413, and a second secondary side winding 414. The first secondary side winding 413 has a first inductive coupling to the first part 411 of the primary side winding, and the second secondary side winding 414 has a second inductive coupling to the second part 412 of the primary side winding. The amplifier and the distributed transformer are arranged in a similar manner as those of part (a) of FIG. 1.

The antenna interface arrangement 400 further comprises one or more of a transmitter port impedance 421, an antenna port impedance 423, and a receiver port impedance 424.

The transmitter port impedance 421 may be connected in parallel to the primary side winding 411, 412, as illustrated in FIG. 4, and is adapted to complement an output impedance of the transmitter port of the transceiver.

The antenna port impedance 423 may be connected in parallel to the first secondary side winding 413, as illustrated in FIG. 4, and is adapted to complement an impedance of the antenna port of the transceiver.

The receiver port impedance 424 may be connected in parallel to the second secondary side winding 414, as illustrated in FIG. 4, and is adapted to complement an input impedance of the receiver port of the transceiver.

Generally, when an impedance is referred to herein it is meant to encompass one or more of a purely real valued impedance (resistance), a purely imaginary valued impedance (capacitance or inductance), and any combination thereof in the form of a complex valued impedance.

Antenna interface arrangements with addition of one or more port impedances as exemplified in FIG. 4, may be particularly useful when one or more of the transceiver ports are non-ideal. One or more of the port impedances may be tunable to accommodate impedance variations of one or more of the transceiver ports.

A distributed transformer, as applied in various embodiments herein, may have any suitable ratio (e.g., ratio 1:1, 1:2, etc.).

Figure 5:
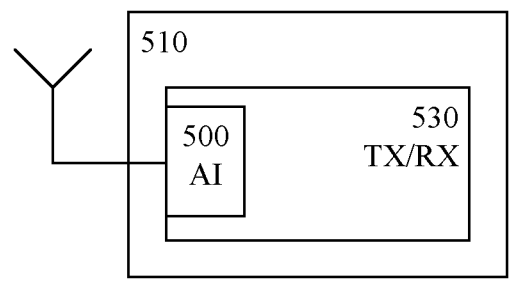
FIG. 5 is a schematic block diagram illustrating an example apparatus according to some embodiments.

FIG. 5 schematically illustrates an example apparatus 510 according to some embodiments.

The apparatus 510 may, for example, be a communication device. The apparatus comprises a transceiver (TX/RX) 530 and an antenna interface arrangement (AI) 500. The transceiver may be a full-duplex transceiver or a half-duplex transceiver. Alternatively or additionally, the transceiver may be a TDD transceiver. The antenna interface arrangement 500 may be any of the antenna interface arrangements described in connection to FIGS. 1-4.

Generally, the cancellation amplifiers of the various embodiments presented herein may be implemented in any suitable manner.

Figure 6:
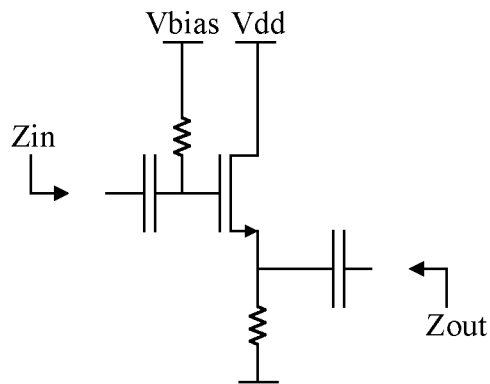
FIG. 6 is a schematic drawing illustrating an example amplifier according to some embodiments.

An example non-inverting cancellation amplifier (compare with 105, 205, 305, 405) implemented with a Common-Drain stage is illustrated in FIG. 6. Typically, the amplifier input capacitance resonates with the first secondary side winding at the desired frequency of operation, and impedance matching at the output is obtained by setting output impedance of the amplifier equal to receiver port impedance.

Figure 7:
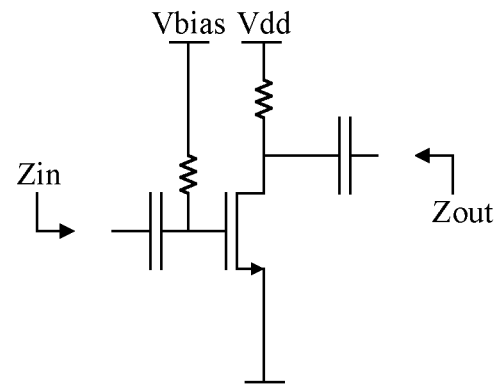
FIG. 7 is a schematic drawing illustrating an example amplifier according to some embodiments.

An example inverting cancellation amplifier (compare with 106, 206, 306) implemented with a Common-Source stage is illustrated in FIG. 7.

Also generally, the distributed transformers of the various embodiments presented herein may be implemented in any suitable manner. The distributed transformer may be an ideal transformer (coupling factor k=1) or a non-ideal transformer (coupling factor k<1, e.g., k=0.85). Some loss may result from using a non-ideal transformer and the phase shift may not be perfect (i.e., 0° or 180°). However, the isolation and noise figure of the antenna interface arrangement are mainly determined by the cancellation amplifier, and remain relatively low even for non-ideal transformers.

Embodiments may appear within an electronic apparatus (such as a transceiver or a communication device) comprising arrangements, circuitry, and/or logic according to any of the embodiments described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

It should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. An antenna interface arrangement for cancellation of a transmit signal at a receiver port of a transceiver, the antenna interface arrangement comprising:
   a distributed transformer comprising:
      a primary side winding connectable to a transmitter port of the transceiver and comprising a first part and a second part;
      a first secondary side winding connectable to an antenna port of the transceiver and having a first inductive coupling to the first part of the primary side winding; and
      a second secondary side winding connectable to the receiver port of the transceiver and having a second inductive coupling to the second part of the primary side winding, wherein the second inductive coupling is adapted to provide a first version of the transmit signal at the receiver port; and
   an amplifier having an input connected to the first secondary side winding and an output connected to the second secondary side winding, wherein the first inductive coupling and the amplifier are adapted to provide a second version of the transmit signal at the receiver port,
   wherein the second version of the transmit signal is arranged to cancel the first version of the transmit signal at the receiver port.

2. The antenna interface arrangement of claim 1, wherein
   a first end of the first part of the primary side winding is connectable to the transmitter port of the transceiver;
   a second end of the first part of the primary side winding is connected to a first end of the second part of the primary side winding;
   a first end of the first secondary side winding is connected to the input of the amplifier and is connectable to the antenna port of the transceiver; and
   a first end of the second secondary side winding is connected to the output of the amplifier and is connectable to the receiver port of the transceiver.

3. The antenna interface arrangement of claim 2, wherein:
   the transmitter port, the receiver port, and the antenna port are single-ended; and
   a second end of the second part of the primary side winding, a second end of the first secondary side winding, and a second end of the second secondary side winding are connectable to a reference potential.

4. The antenna interface arrangement of claim 3, wherein the first and second inductive couplings are non-inverting inductive couplings, and the amplifier is an inverting amplifier.

5. The antenna interface arrangement of claim 3, wherein one of the first and second inductive couplings is an inverting inductive coupling, the other one of the first and second inductive couplings is a non-inverting inductive coupling, and the amplifier is a non-inverting amplifier.

6. The antenna interface arrangement of claim 2, wherein:
   the transmitter port, the receiver port, and the antenna port are differential ports having a positive terminal and a negative terminal;
   a second end of the second part of the primary side winding is connectable to the transmitter port of the transceiver;
   a second end of the first secondary side winding is connectable to the antenna port of the transceiver; and
   a second end of the second secondary side winding is connectable to the receiver port of the transceiver.

7. The antenna interface arrangement of claim 6, wherein:
   the first and second inductive couplings are non-inverting inductive couplings; and
   the amplifier comprises:
      an inverting amplifier connectable between the positive terminal of the antenna port and the positive terminal of the receiver port, and
      an inverting amplifier connectable between the negative terminal of the antenna port and the negative terminal of the receiver port.

8. The antenna interface arrangement of claim 6, wherein:
   the first and second inductive couplings are non-inverting inductive couplings; and
   the amplifier comprises:
      a non-inverting amplifier connectable between the positive terminal of the antenna port and the negative terminal of the receiver port, and
      a non-inverting amplifier connectable between the negative terminal of the antenna port and the positive terminal of the receiver port.

9. The antenna interface arrangement of claim 6, wherein:
   one of the first and second inductive couplings is an inverting inductive coupling;
   the other one of the first and second inductive couplings is a non-inverting inductive coupling; and
   the amplifier comprises:
      an inverting amplifier connectable between the positive terminal of the antenna port and the negative terminal of the receiver port, and
      an inverting amplifier connectable between the negative terminal of the antenna port and the positive terminal of the receiver port.

10. The antenna interface arrangement of claim 6, wherein:
   one of the first and second inductive couplings is an inverting inductive coupling;

the other one of the first and second inductive couplings is a non-inverting inductive coupling; and the amplifier comprises:
- a non-inverting amplifier connectable between the positive terminal of the antenna port and the positive terminal of the receiver port, and
- a non-inverting amplifier connectable between the negative terminal of the antenna port and the negative terminal of the receiver port.

11. The antenna interface arrangement of claim 1, further comprising one or more of the following:
- a receiver port impedance connected in parallel with the second secondary side winding and adapted to complement an input impedance of the receiver port of the transceiver; and
- a transmitter port impedance connected in parallel with the primary side winding and adapted to complement an output impedance of the transmitter port of the transceiver.

12. The antenna interface arrangement of claim 1, wherein an amplitude impact of the second inductive coupling on the transmit signal is equal to an amplitude impact on the transmit signal of a combination of the first inductive coupling and the amplifier.

13. The antenna interface arrangement of claim 1, wherein a phase impact of the second inductive coupling on the transmit signal and a phase impact on the transmit signal of a combination of the first inductive coupling and the amplifier has a modulo $2\pi$ phase difference equal to $\pi$ for a periodic transmit signal.

14. A transceiver comprising the antenna interface arrangement of claim 1.

15. The transceiver of claim 14, wherein the transceiver is a full-duplex transceiver or a half-duplex transceiver.

16. The transceiver of claim 14, wherein the transceiver is a time division duplex (TDD) transceiver.

17. A communication device comprising the transceiver of claim 14.

* * * * *